United States Patent
Katsuyama et al.

(10) Patent No.: US 10,464,490 B2
(45) Date of Patent: Nov. 5, 2019

(54) DISPLAY CONTROL APPARATUS, DISPLAY CONTROL METHOD, AND CAMERA MONITORING SYSTEM

(71) Applicant: ALPINE ELECTRONICS, INC., Shinagawa-ku, Tokyo (JP)

(72) Inventors: Yoshihiro Katsuyama, Iwaki (JP); Keita Taniguchi, Iwaki (JP); Daisuke Omori, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/982,179

(22) Filed: May 17, 2018

(65) Prior Publication Data

US 2018/0370439 A1      Dec. 27, 2018

(30) Foreign Application Priority Data

Jun. 26, 2017   (JP) ................. 2017-124635

(51) Int. Cl.
*B60R 1/12*      (2006.01)

(52) U.S. Cl.
CPC ........ *B60R 1/12* (2013.01); *B60R 2001/1215* (2013.01); *B60R 2300/306* (2013.01); *B60R 2300/804* (2013.01)

(58) Field of Classification Search
None
See application file for complete search history.

(56) References Cited

U.S. PATENT DOCUMENTS

| 5,670,935 | A  | * | 9/1997  | Schofield | B60N 2/002 340/461 |
| 8,441,536 | B2 | * | 5/2013  | Imanishi  | B60R 1/00 348/143 |
| 8,964,058 | B2 | * | 2/2015  | Otuka     | H04N 5/23229 348/148 |
| 9,809,221 | B2 | * | 11/2017 | Ann       | B60K 35/00 |
| 10,059,264| B2 | * | 8/2018  | Kato      | B60R 1/00 |
| 2007/0025637 | A1 | | 2/2007 | Setlur et al. | |

(Continued)

FOREIGN PATENT DOCUMENTS

| JP | 2013-85142  | 5/2013 |
| JP | 2013-085142 | 5/2013 |

OTHER PUBLICATIONS

Extended European Search Report for 18179554.3 dated Oct. 15, 2018, 33 pgs.

*Primary Examiner* — Fernando Alcon
(74) *Attorney, Agent, or Firm* — Brinks Gilson & Lione

(57) ABSTRACT

A display control apparatus connected to an imaging apparatus installed in a vehicle includes an obtaining unit which obtains image data obtained by the imaging apparatus capturing an image of a portion on a rear side of the vehicle, a specifying unit which specifies, as a compression region, a pixel region which does not include image elements indicating straight objects extending along a traveling direction of the vehicle in a pixel region in a lower portion in the image data, a generation unit which generates display image data of a predetermined display size by compressing the specified compression region in the image data, and a controller which performs control so that the generated display image data is visually recognized through an electronic mirror disposed as a rearview mirror of the vehicle.

21 Claims, 13 Drawing Sheets

(56) References Cited

U.S. PATENT DOCUMENTS

| | | | |
|---|---|---|---|
| 2009/0079585 A1* | 3/2009 | Chinomi | B60R 1/00 340/901 |
| 2013/0038735 A1* | 2/2013 | Nishiguchi | B60R 1/06 348/148 |
| 2014/0118551 A1* | 5/2014 | Ikeda | B60R 1/00 348/148 |

* cited by examiner

DISPLAY CONTROL APPARATUS, DISPLAY CONTROL METHOD, AND CAMERA MONITORING SYSTEM

RELATED APPLICATION

The present application claims priority to Japanese Patent Application Number 2017-124635, filed Jun. 26, 2017, the entirety of which is hereby incorporated by reference.

BACKGROUND

1. Field of the Invention

The present invention relates to a display control apparatus, a display control method, and a camera monitoring system.

2. Description of the Related Art

In general, a display control technique of operating a display apparatus or the like as an electronic mirror by installing a camera monitoring system in a vehicle and displaying images obtained by capturing a rear side of the vehicle in the display apparatus or the like in the vehicle has been known.

In general, when the display apparatus or the like functions as an electronic mirror, a display size thereof is smaller than an image size of the captured image. Therefore, in such a camera monitoring system, a process of converting a size of a captured image into a size suitable for display is performed by deleting portions of a pixel region of the captured image, compressing a pixel region located in a lower portion of the captured image, or the like is performed, for example.

Here, the pixel region located in the lower portion in the captured image corresponds to a position comparatively close to a user's vehicle in a space on the rear side of the vehicle. Therefore, when a configuration in which the pixel region in the lower portion is compressed is employed, a larger region to be particularly checked by a driver may be incorporated in an image obtained after the conversion and a blind region of the driver may be efficiently reduced. The related technique is disclosed in Japanese Unexamined Patent Application Publication No. 2013-85142, for example.

However, when the configuration in which the pixel region in the lower portion is compressed is employed, the driver has a feeling of strangeness when the user's vehicle is not followed by another vehicle or when a following vehicle is positioned far away from the user's vehicle. In the captured image, if a boundary between a region to be compressed and a region not to be compressed is discontinuous, an object having a straight shape along a vehicle traveling direction, such as a traffic lane line, is seen to be bent in the boundary.

SUMMARY

The present disclosure is made in view of the foregoing situation and an object of the present disclosure is to reduce a feeling of strangeness in an image viewed and recognized through the electronic mirror.

According to an aspect of the present disclosure, a display control apparatus has the following configuration. That is, a display control apparatus connected to an imaging apparatus installed in a vehicle includes an obtaining unit configured to obtain image data obtained by the imaging apparatus capturing an image of a portion on a rear side of the vehicle, a specifying unit configured to specify, as a compression region, a pixel region which does not include image elements indicating straight objects extending along a traveling direction of the vehicle in a pixel region in a lower portion in the image data, a generation unit configured to generate display image data of a predetermined display size by compressing the specified compression region in the image data, and a controller configured to perform control so that the generated display image data is visually recognized through an electronic mirror disposed as a rearview mirror of the vehicle.

A feeling of strangeness caused by an image visually recognized through an electronic mirror may be reduced.

DETAILED DESCRIPTION OF THE PREFERRED EMBODIMENTS

Figure 1:
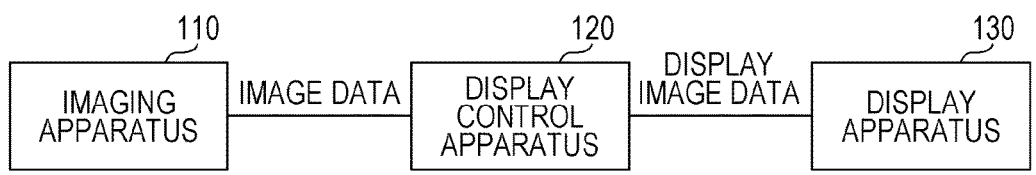
FIG. 1 is a diagram illustrating an example of a configuration of a camera monitoring system according to a first embodiment.

Hereinafter, embodiments will be described with reference to the accompanying drawings. Note that components having substantially the same functional configuration are denoted by the same reference numeral, and therefore, a redundant description thereof is omitted.

First Embodiment

Configuration of Camera Monitoring System

First, a configuration of a camera monitoring system installed in a vehicle will be described. FIG. 1 is a diagram illustrating an example of a configuration of a camera monitoring system according to a first embodiment. As illustrated in FIG. 1, a camera monitoring system 100 includes an imaging apparatus 110, a display control apparatus 120, and a display apparatus 130. Note that, in this embodiment, the camera monitoring system 100 is activated when an ignition switch of the vehicle is turned on and stops when the ignition switch is turned off. However, the camera monitoring system 100 may be activated or stopped in response to an instruction issued by a driver of the vehicle.

The imaging apparatus 110 captures images of a rear side of the vehicle. The imaging apparatus 110 transmits image data obtained by inverting the captured image in a horizontal direction to the display control apparatus 120. The display control apparatus 120 specifies a compression region, in the image data, to be converted (compressed) to have an image size suitable for a display size of the display apparatus 130 in the pixel region in a lower portion in the image data supplied from the imaging apparatus 110. Note that the compression region is specified such that the driver does not have a feeling of strangeness when generated display image data is displayed in the display apparatus 130 (a detailed description will be made hereinafter). The display control apparatus 120 extracts the specified compression region from the image data and compresses the extracted compression region so as to generate a compression pixel region which is a portion of the display image data.

The display control apparatus 120 specifies a deletion region including image data to be converted (deleted) into an image size suitable for a display size of the display apparatus 130 in the lower portion of the image data supplied from the imaging apparatus 110. The display control apparatus 120 deletes the specified deletion region. The display control apparatus 120 incorporates the compression pixel region in the image data which has been subjected to the deletion so as to generate display image data. The display control apparatus 120 transmits the generated display image data to the display apparatus 130.

The display apparatus 130 is an example of an output apparatus and is constituted by a liquid crystal display apparatus in this embodiment. The display apparatus 130 displays the display image data supplied from the display control apparatus 120.

Installation of Display Apparatus

Figure 2:
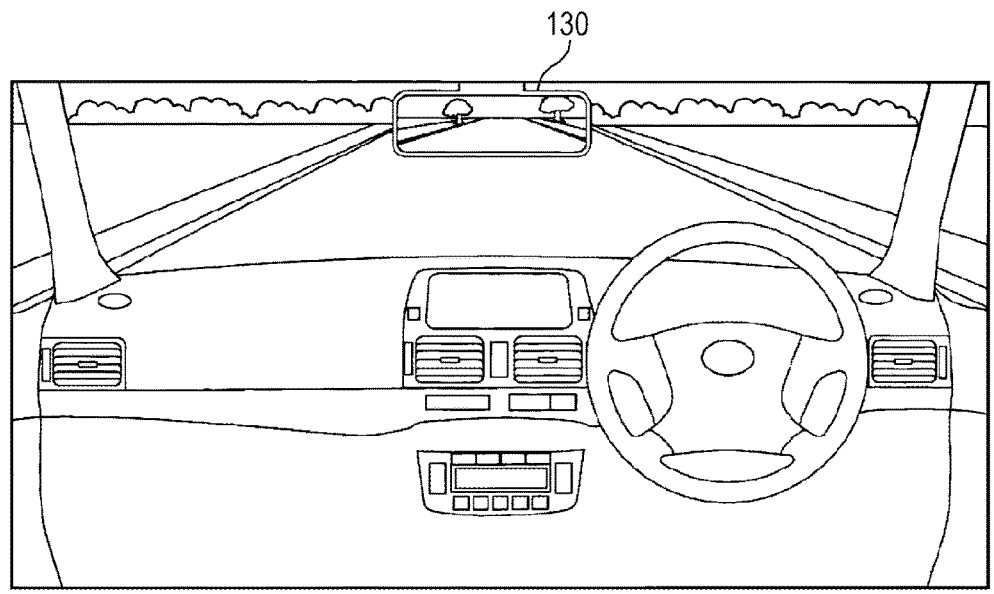
FIG. 2 is a diagram illustrating an example of installation of a display apparatus.

An example of installation of the display apparatus 130 will now be described. FIG. 2 is a diagram illustrating an example of the installation of the display apparatus 130. As illustrated in FIG. 2, the display apparatus 130 is disposed in a position of an in-vehicle rearview mirror in the vehicle (a center position in a front window on a near side) and functions as an electronic mirror which is a substitute of the in-vehicle rearview mirror.

Figure 3A:
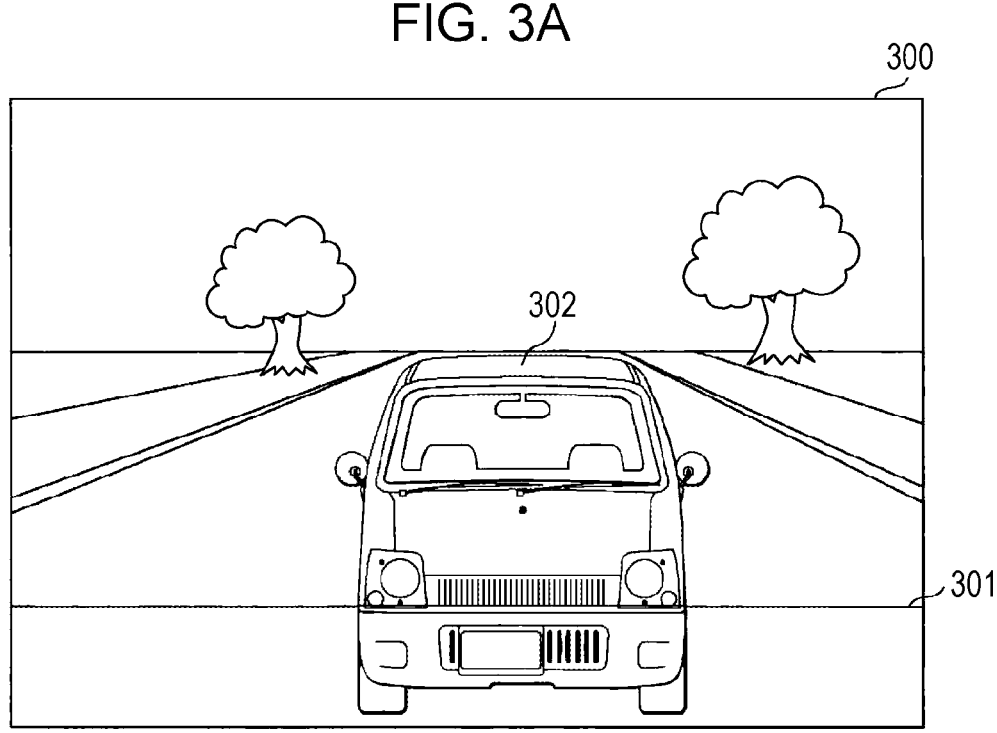
FIGS. 3A and 3B are diagrams illustrating the relationship between an image size of image data and a display size of the display apparatus.
Figure 3B:
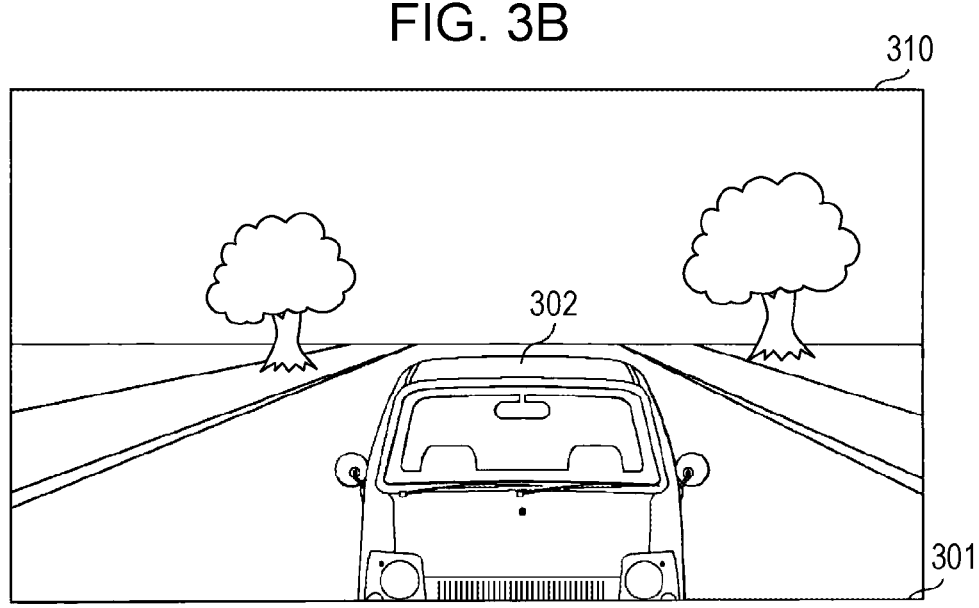

Relationship between Image Size of Image Data and Display Size of Display Apparatus Next, the relationship between an image size of the image data transmitted from the imaging apparatus 110 and the display size of the display apparatus 130 will be described. FIGS. 3A and 3B are diagrams illustrating the relationship between the image size of the image data and the display size of the display apparatus 130.

Specifically, FIG. 3A is a diagram illustrating an image size of image data 300. A horizontal line overlapping the image data 300 in FIG. 3A indicates a lower limit position 301 of the display size of the display apparatus 130.

It is assumed here that a process of converting the image size of the image data 300 into a size suitable for the display size by deleting a pixel region on a lower side of the lower limit position 301 of the display size in the image data 300 is performed. In this case, the image data subjected to the deletion is illustrated in FIG. 3B. As illustrated in FIG. 3B, in a case of image data 310 obtained by deleting the pixel region on the lower side of the lower limit position 301 so as to be suitable for the display size of the display apparatus 130, a region corresponding to a position comparatively close to the own vehicle in a space on the rear side of the vehicle may not be displayed in the display apparatus 130.

Therefore, in general camera monitoring systems, the process of converting a size of image data into a size suitable for a display size is performed by compressing a pixel region in a predetermined lower portion in the image data 300 as a compression region.

Figure 4A:
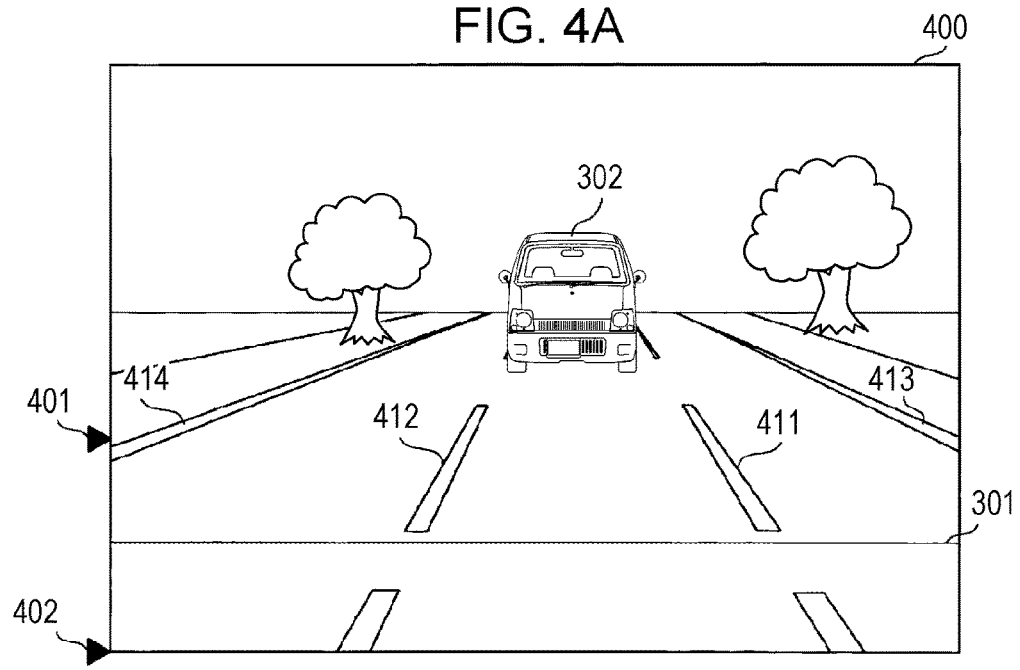
FIGS. 4A and 4B are diagrams illustrating a state in which a pixel region in a lower portion of image data is compressed as a compression region and a size of the image data is changed so as to be suitable for the display size.
Figure 4B:
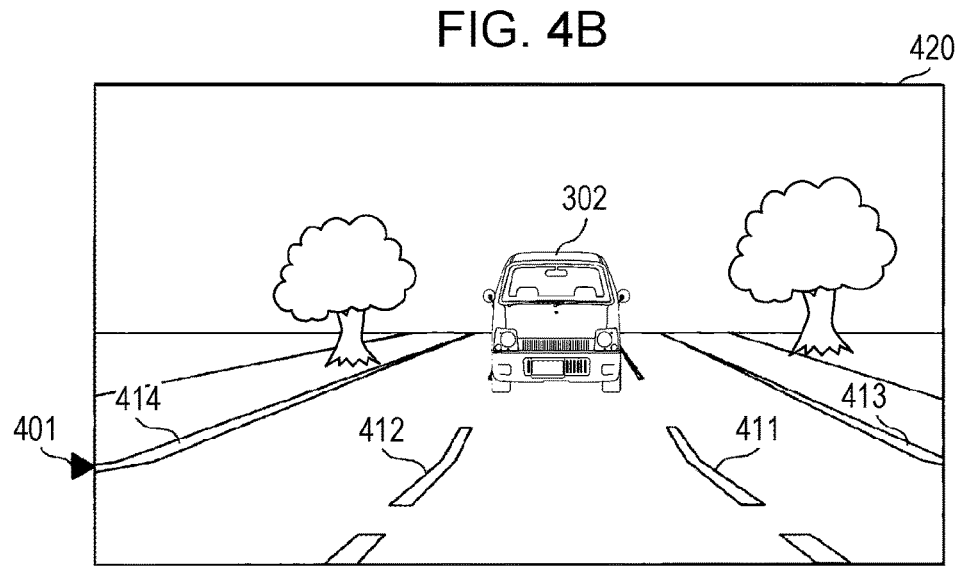

FIGS. 4A and 4B are diagrams illustrating a state in which a pixel region in a lower portion of image data is compressed as a compression region and a size of the image data is converted into a display size. In FIG. 4A, a first reference position 401 in image data 400 indicates an upper limit position of the lower pixel region (the compression region) subjected to the compression. Furthermore, a second reference position 402 in the image data 400 indicates a lower limit position of the lower pixel region (the compression region) subjected to the compression.

Note that, in a case where a following vehicle is positioned far away from the user's vehicle as illustrated in FIG. 4A, the image data 400 includes a large number of image elements indicating straight objects extending along (substantially parallel to) a vehicle traveling direction. For example, the image data 400 includes image elements 411 and 412 indicating traffic lane lines and image elements 413 and 414 indicating curbs between a road and sidewalks.

FIG. 4B is a diagram illustrating an example of display image data generated by compressing the lower pixel region defined by the first and second reference positions 401 and 402 as a compression region in the image data 400. As illustrated in FIG. 4B, in generated display image data 420, a boundary between the compression region and a non-compression region is discontinuous, and therefore, the image elements 411 and 412 indicating traffic lane lines bend at the boundary. Similarly, the image elements 413 and 414 indicating the curbs between the road and the sideways bend at the boundary. Therefore, when the generated display image data 420 is visually recognized through the display apparatus 130, the driver of the vehicle has a feeling of strangeness.

Accordingly, the display control apparatus 120 specifies a compression region so that the image elements 411 and 412 indicating the traffic lane lines positioned on a rear side of the vehicle and the image elements 413 and 414 indicating the curbs between the street and the sideways do not bend at the boundary. Specifically, the display control apparatus 120 specifies only a portion of the lower pixel region in the image data 400 as the compression region to be compressed. By this, the display control apparatus 120 may reduce the feeling of strangeness of the driver of the vehicle when generated display image data is visually recognized through the display apparatus 130. Hereinafter, the display control apparatus 120 will be described in detail.

Brief Description of Method for Generating Display Image Data

Figure 5A:
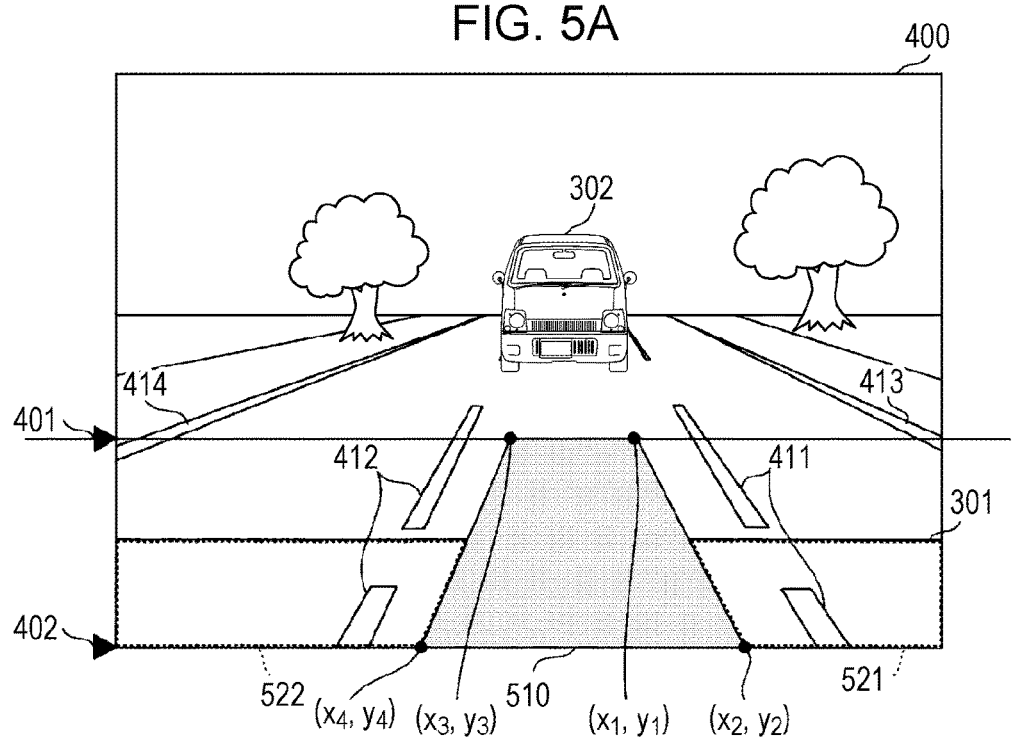
FIGS. 5A and 5B are diagrams schematically illustrating a method for generating display image data according to the first embodiment.
Figure 5B:
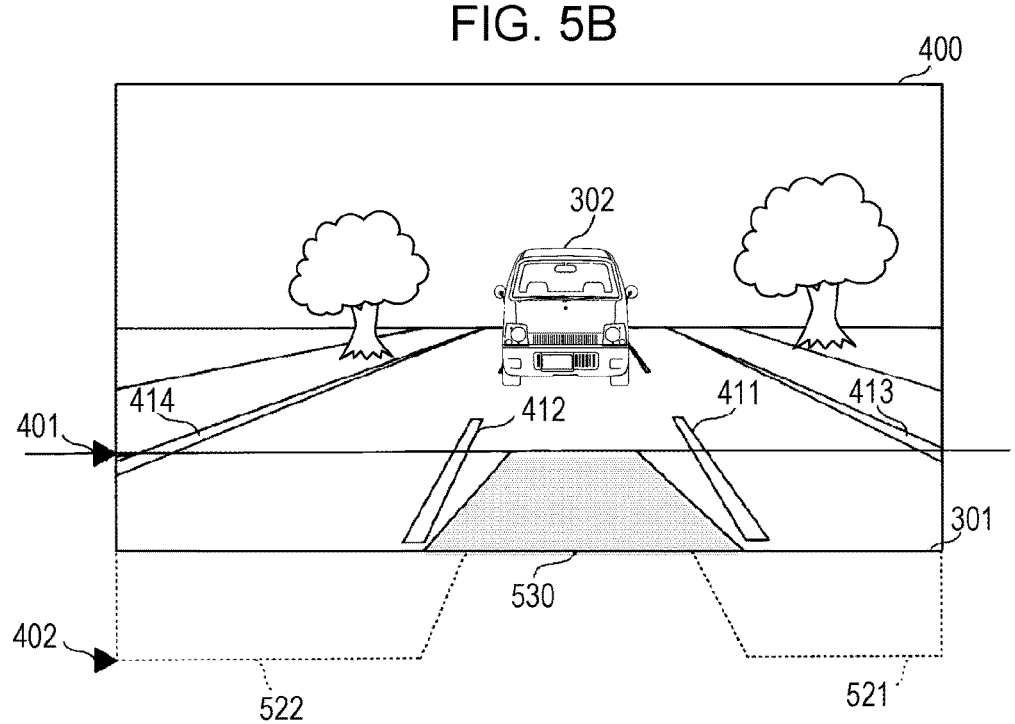

First, a method for generating display image data according to the first embodiment will be briefly described. FIGS. 5A and 5B are diagrams schematically illustrating a method for generating display image data according to the first embodiment.

In FIG. 5A, a pixel region 510 in the image data 400 indicates a compression region. The pixel region 510 is a portion of the lower pixel region (the general compression region) defined by the first reference position 401 and the second reference position 402. Specifically, the pixel region 510 is specified so as not to incorporate the image elements 411 and 412 indicating the traffic lane lines positioned on the rear side of the vehicle.

As illustrated in FIG. 5A, the pixel region 510 is specified by position coordinates (x1, y1) to (x4, y4) of four apices in the image data 400. The position coordinates (x1, y1) to (x4, y4) of the four apices in the image data 400 are determined in advance in accordance with a position where the imaging apparatus 110 is disposed. Specifically, the position coordinates (x1, y1) to (x4, y4) of the four apices are determined as positions which do not include the image elements 411 and 412 indicating the traffic lane lines located on the rear side of the user's vehicle (positions in the vicinity of a center position in a width direction of the vehicle).

Furthermore, in FIG. 5A, deletion regions 521 and 522 indicate regions in the image data 400 which are to be deleted when display image data is generated. In the image data 400, the deletion regions 521 and 522 are determined in advance based on a difference between a size of the image data 400 and a size of the display image data and are other than the pixel region 510 in a region on a lower side of the lower limit position 301.

FIG. 5B is a diagram illustrating a state in which the pixel region 510 is compressed and the deletion regions 521 and 522 are deleted in the image data 400. As illustrated in FIG. 5B, when the pixel region 510 is compressed, a compression pixel region 530 is generated. Furthermore, when the deletion regions 521 and 522 are deleted, the size of the image data 400 may be converted into the display size.

Furthermore, as illustrated in FIG. 5B, the image elements 411 and 412 indicating the traffic lane lines are not compressed in the image data 400, and therefore, the image elements 411 and 412 indicating the traffic lane lines do not bend. Accordingly, the feeling of strangeness of the driver caused by the display image data visually recognized through the electronic mirror may be avoided.

Furthermore, since the region positioned comparatively in the vicinity of the own vehicle in the space on the rear side of the vehicle is compressed (refer to the compression pixel region 530) as illustrated in FIG. 5B, a large region which is desired by the driver of the vehicle to be checked may be incorporated in an image obtained after the conversion.

Hardware Configuration of Display Control Apparatus

Figure 6:
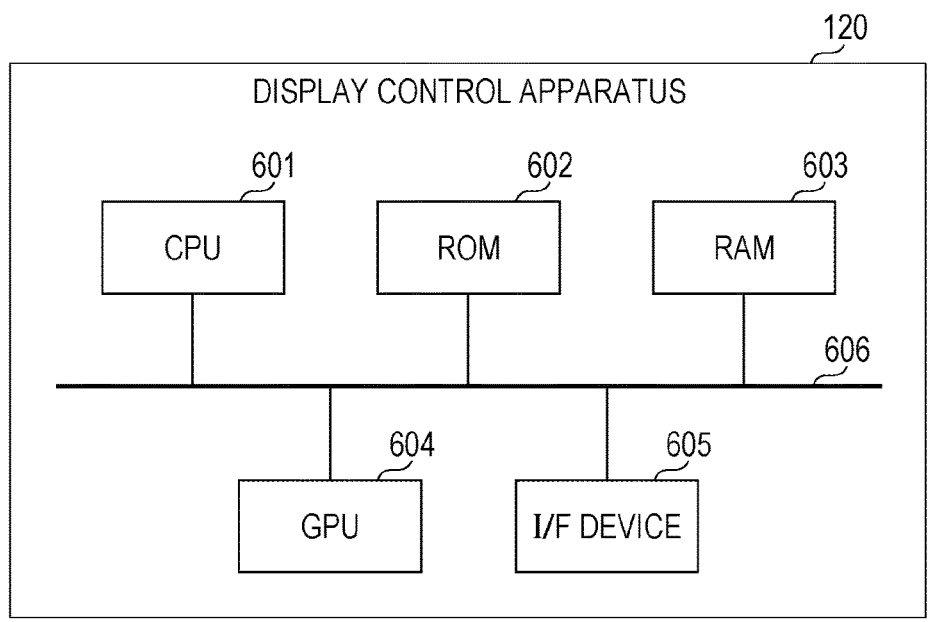
FIG. 6 is a diagram illustrating an example of a hardware configuration of a display control apparatus.

Next, a hardware configuration of the display control apparatus 120 will be described. FIG. 6 is a diagram illustrating an example of a hardware configuration of the display control apparatus 120. The display control apparatus 120 includes a central processing unit (CPU) 601, a read only memory (ROM) 602, and a random access memory (RAM) 603 as illustrated in FIG. 6. The display control apparatus 120 further includes a graphic processing unit (GPU) 604 and an interface (I/F) device 605. Note that the units included in the display control apparatus 120 are connected to one another through a bus 606.

The CPU 601 executes various programs (including a display control program) installed in the ROM 602. The ROM 602 which is a nonvolatile memory functions as a main storage device which stores the various programs to be executed by the CPU 601. The RAM 603 is a volatile memory, such as a dynamic random access memory (DRAM) or a static random access memory (SRAM). The RAM 603 functions as the main storage device which provides a work area in which the various programs installed in the ROM 602 are developed before being executed by the CPU 601.

The GPU 604 is an integrated circuit dedicated for image processing and performs generation of display image data to be displayed in the display apparatus 130 in response to an instruction issued by the CPU 601 which executes the display control program in this embodiment. The I/F device 605 is a connection device for connecting the imaging apparatus 110 and the display apparatus 130 to the display control apparatus 120.

Functional Configuration of Display Control Apparatus

Figure 7:
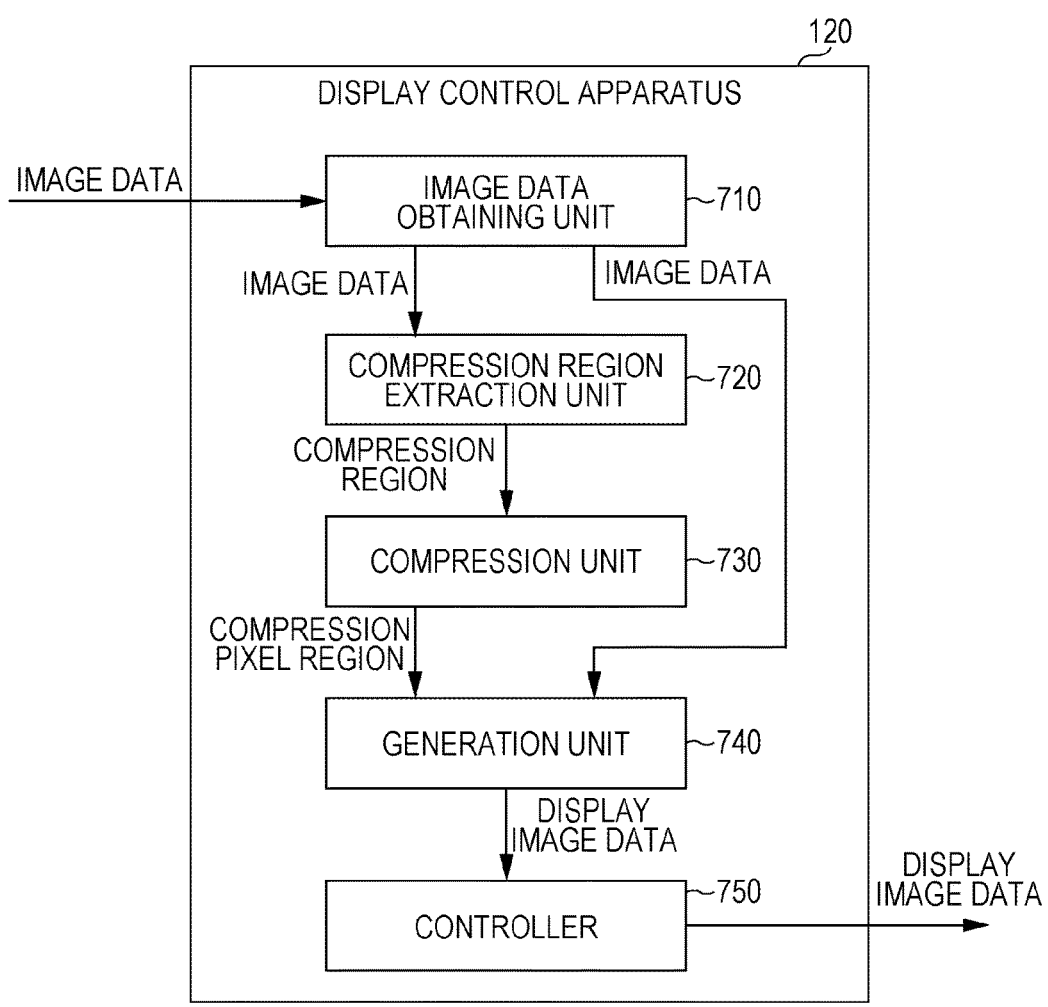
FIG. 7 is a diagram illustrating an example of a functional configuration of the display control apparatus according to the first embodiment.

Next, a functional configuration of the display control apparatus 120 will be described. FIG. 7 is a diagram illustrating an example of a functional configuration of the display control apparatus 120 according to the first embodiment. As described above, the display control program is installed in the display control apparatus 120. When the camera monitoring system 100 is activated, the display control apparatus 120 executes the display control program. By this, the display control apparatus 120 functions as an image data obtaining unit 710, a compression region extraction unit 720, a compression unit 730, a generation unit 740, and a controller 750.

The image data obtaining unit 710 which is an example of an obtaining unit obtains image data transmitted from the imaging apparatus 110. The image data obtaining unit 710 transmits the obtained image data to the compression region extraction unit 720 and the generation unit 740 in a unit of frame.

The compression region extraction unit 720 which is an example of a specifying unit specifies the pixel region 510 in the image data 400 using the position coordinates (x1, y1) to (x4, y4) in the image data 400 which are determined in advance in accordance with the position where the imaging apparatus 110 is disposed. Furthermore, the compression region extraction unit 720 extracts the specified pixel region 510 as a compression region to be transmitted to the compression unit 730.

The compression unit 730 compresses the compression region transmitted from the compression region extraction unit 720 so as to generate the compression pixel region 530. The compression unit 730 compresses the compression region so that the lower limit position of the compression region matches the lower limit position 301 of the image data 400 so as to generate the compression pixel region 530. Furthermore, the compression unit 730 transmits the generated compression pixel region 530 to the generation unit 740.

The generation unit 740 deletes the region positioned on a lower side relative to the lower limit position 301 of the image data 400 transmitted from the image data obtaining unit 710 before incorporating the compression pixel region 530 transmitted from the compression unit 730 into a corresponding position so as to generate display image data. Furthermore, the generation unit 740 transmits the generated display image data to the controller 750.

The controller 750 causes the display apparatus 130 to display the display image data transmitted from the generation unit 740. By this, the driver of the vehicle may visibly recognize the display image data through the display apparatus 130.

Flow of Display Control Process

Figure 8:
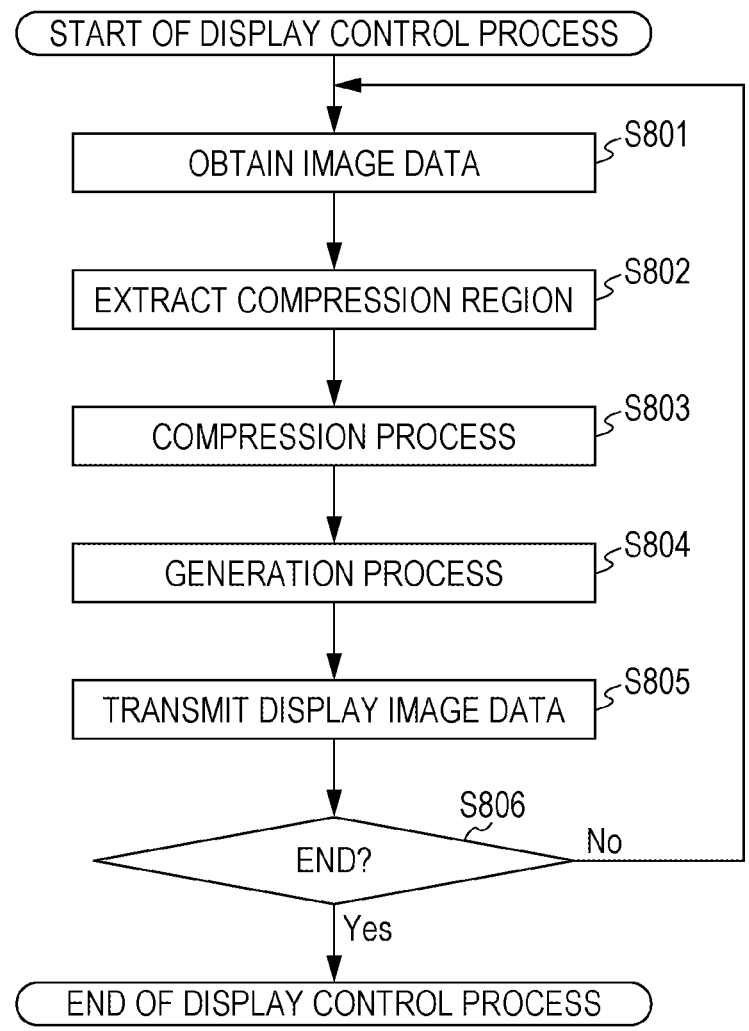
FIG. 8 is a flowchart of a flow of a display control process.

Next, a flow of a display control process executed by the display control apparatus 120 will be described. FIG. 8 is a flowchart of the flow of the display control process. When the camera monitoring system 100 is activated, the display control apparatus 120 executes the display control process illustrated in FIG. 8.

In step S801, the image data obtaining unit 710 obtains image data transmitted from the imaging apparatus 110 and transmits the image data to the compression region extraction unit 720 and the generation unit 740 on a frame-by-frame basis.

In step S802, the compression region extraction unit 720 extracts a compression region in the image data and transmits the compression region to the compression unit 730. In step S803, the compression unit 730 compresses the compression region transmitted from the compression region extraction unit 720 so as to generate a compression pixel region.

In step S804, the generation unit 740 deletes the region positioned on a lower side relative to the lower limit position 301 of the image data transmitted from the image data obtaining unit 710 before incorporating the compression pixel region transmitted from the compression unit 730 into a corresponding position so as to generate display image data.

In step S805, the controller 750 transmits the display image data to the display apparatus 130 and causes the display apparatus 130 to display the display image data. In step S806, the image data obtaining unit 710 determines whether the display control process is to be terminated. When the camera monitoring system 100 is not stopped, the image data obtaining unit 710 determines that the display control process is not to be terminated in step S806 (No) and the process returns to step S801.

On the other hand, when the camera monitoring system 100 is stopped, the image data obtaining unit 710 determines that the display control process is to be terminated in step S806 (Yes) and the display control process is terminated.

Concrete Example of Display Image Data

Figure 9A:
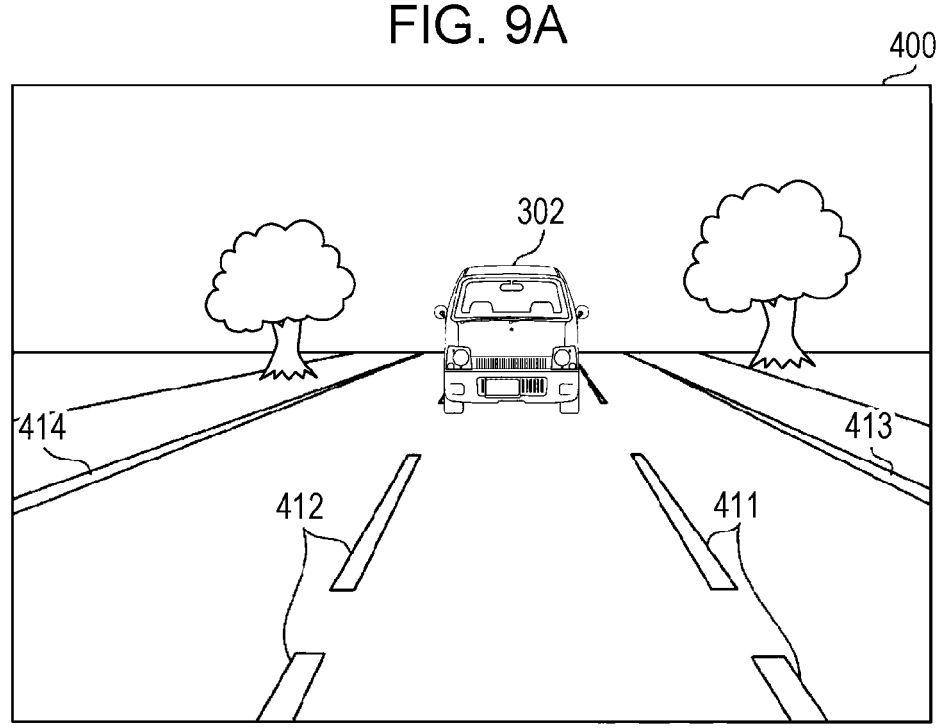
FIGS. 9A and 9B are first diagrams illustrating a concrete example of the display image data generated by the display control apparatus according to the first embodiment.
Figure 9B:
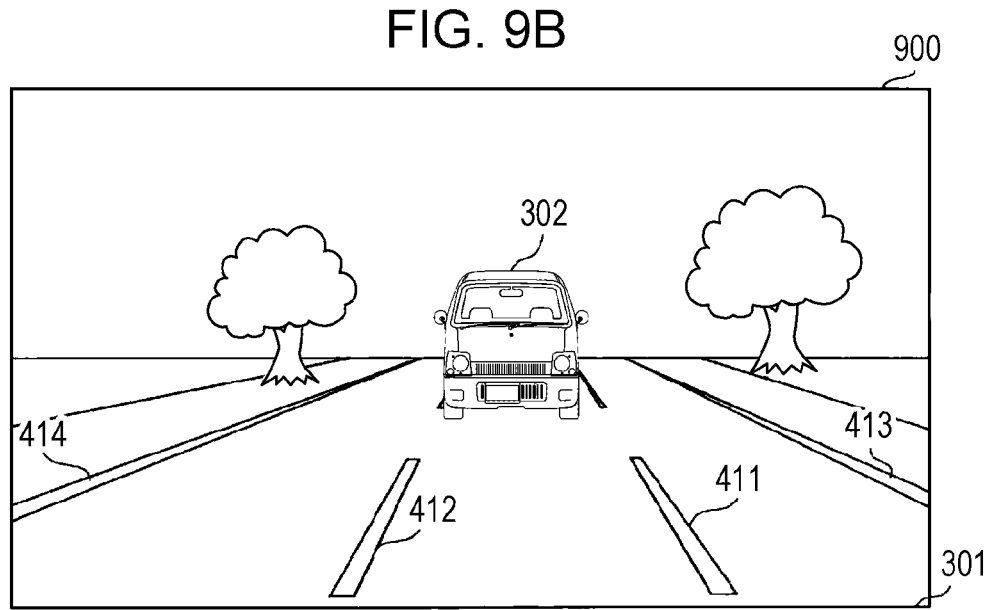

Next, a concrete example of the display image data generated by the display control apparatus 120 will be described. FIGS. 9A and 9B are first diagrams illustrating a concrete example of the display image data generated by the display control apparatus 120 according to the first embodiment. In FIG. 9A, the image data 400 transmitted from the imaging apparatus 110 is displayed as a comparison. In FIG. 9B, display image data 900 generated by the display control apparatus 120 based on the image data 400 of FIG. 9A is illustrated.

According to the display image data 900 of FIG. 9B, the display control apparatus 120 may convert the image size of the image data 400 into a size suitable for display. Furthermore, according to the display image data 900 of FIG. 9B, the display control apparatus 120 avoids bending of the image elements 411 and 412 indicating the traffic lane lines and the image elements 413 and 414 indicating the curbs between the road and the sideways.

Figure 10A:
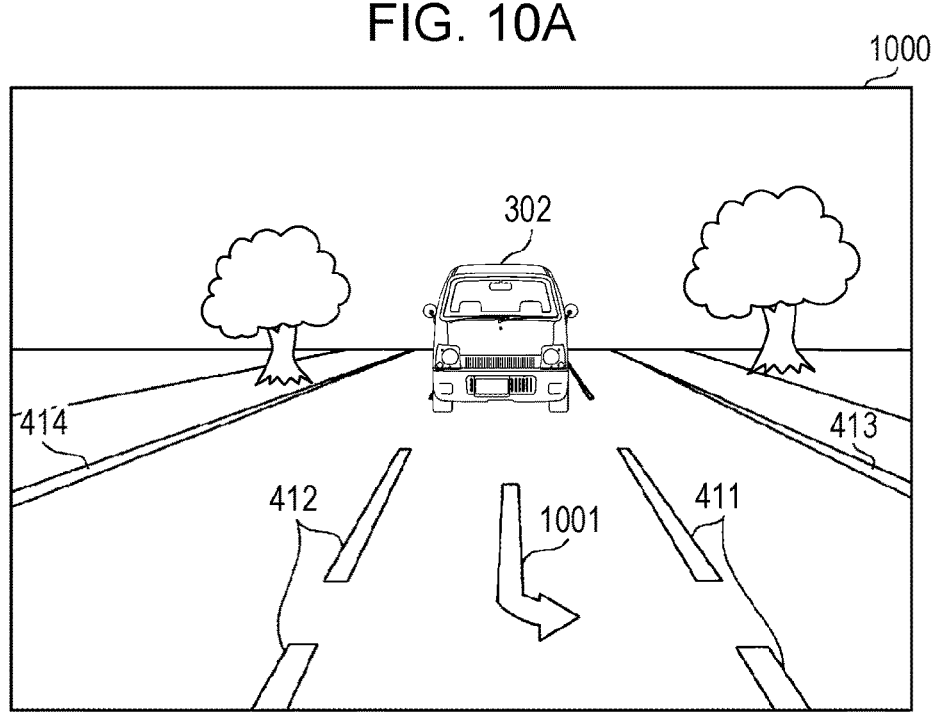
FIGS. 10A and 10B are second diagrams illustrating a concrete example of the display image data generated by the display control apparatus according to the first embodiment.
Figure 10B:
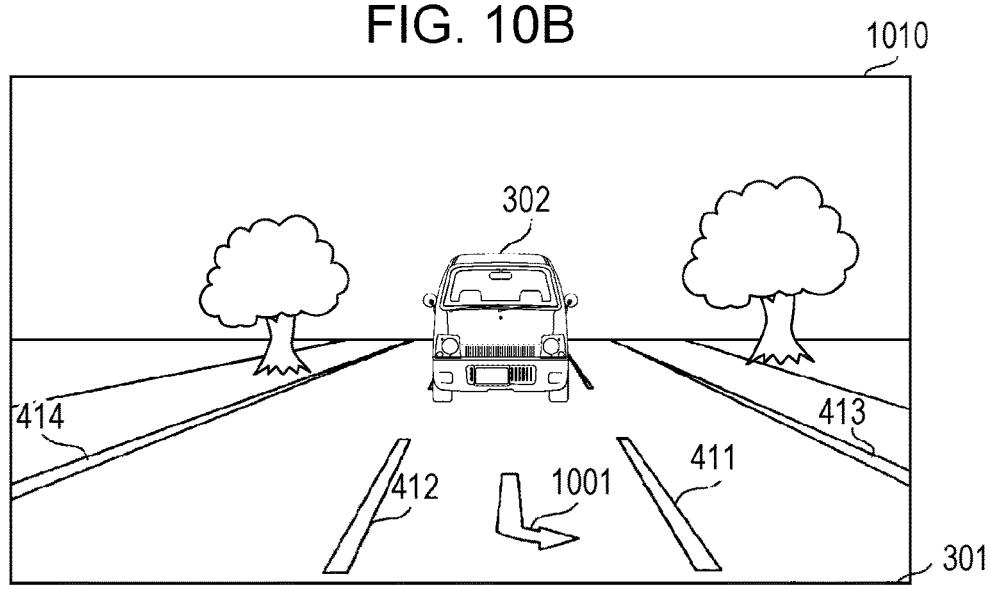

FIGS. 10A and 10B are second diagrams illustrating a concrete example of the display image data generated by the display control apparatus 120 according to the first embodiment. Note that FIGS. 10A and 10B are different from FIGS. 9A and 9B in image data to be used for generation of the display image data. As illustrated in FIG. 10A, image data 1000 includes an image element 1001 indicating a road surface sign between the image elements 411 and 412 indicating the traffic lane lines.

Even in this case, the display control apparatus 120 executes a similar generation process on the image data 1000 so as to generate display image data 1010. As illustrated in the display image data 1010 of FIG. 10B, the image element 1001 indicating the road surface sign is compressed in a vertical direction by the display control apparatus 120. Therefore, although a length is reduced when compared with the image element 1001 before the compression (the image element 1001 indicating the road surface sign in the image data 1000 of FIG. 10A), the entire road surface sign may be incorporated in the display image data 1010 obtained after the conversion. Furthermore, the compression region to be compressed by the display control apparatus 120 is positioned only in a center of the image data 1000, and therefore, even if a boundary between the compression region and a non-compression region is discontinuous, influence thereof may be small or negligible. Therefore, the image element 1001 indicating the road surface sign does not bend (or does not bend to a degree in which at least the driver visually recognizes the bend).

Conclusion

As is apparent from the description above, the display control apparatus 120 of this embodiment performs the following process.

The display control apparatus 120 determines in advance position coordinates of a pixel region which does not include image elements indicating straight objects extending along a vehicle traveling direction, such as a traffic lane line, in image data obtained by the imaging apparatus capturing an image of a portion on a rear side of a vehicle based on an installation position of the imaging apparatus.

The display control apparatus 120 compresses the pixel region in the image data specified based on the determined positional coordinates as a compression region so as to generate a compression pixel region.

The display control apparatus 120 generates display image data by incorporating the generated compression pixel region in a position corresponding to the image data in which a region on a lower side relative to the lower limit position of the display size is deleted.

Accordingly, in the display image data generated by the display control apparatus 120, the image elements indicating straight objects extending along the vehicle traveling direction, such as a traffic lane line, do not bend. Specifically, the display control apparatus 120 of this embodiment may reduce the feeling of strangeness caused by the display image data visually recognized through the electronic mirror.

Second Embodiment

According to the first embodiment described above, the position coordinates of the pixel region to be extracted as a compression region are determined in advance in accordance with a position where the imaging apparatus is disposed so that image elements indicating traffic lane lines are not incorporated.

On the other hand, according to a second embodiment, image elements indicating traffic lane lines are detected in image data and position coordinates of a pixel region to be extracted as a compression region are determined based on the detected image elements. Hereinafter, portions of the second embodiment different from those of the first embodiment will be mainly described.

Functional Configuration of Display Control Apparatus

Figure 11:
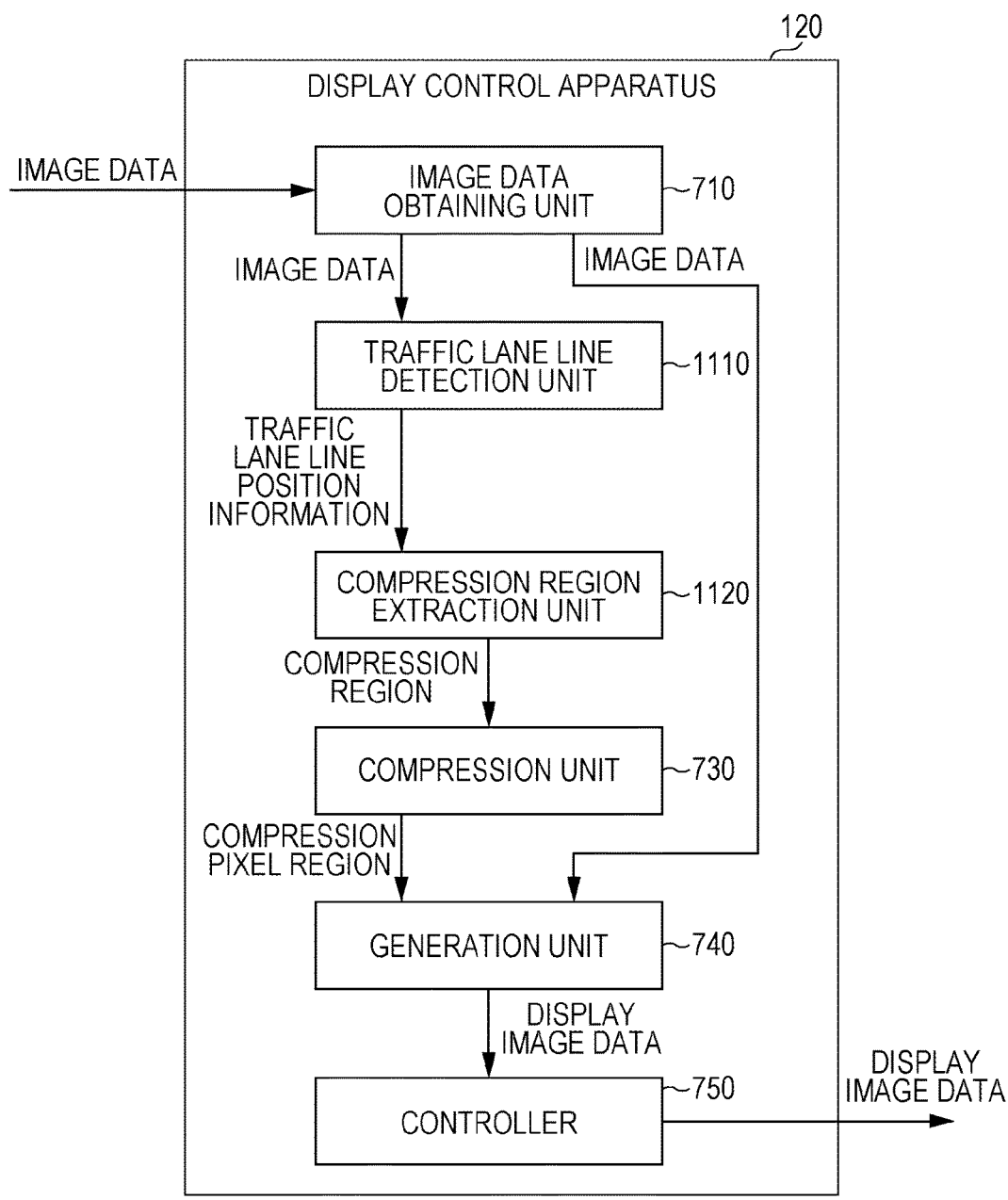
FIG. 11 is a diagram illustrating an example of a functional configuration of the display control apparatus according to a second embodiment.

First, a functional configuration of a display control apparatus according to the second embodiment will be described. FIG. 11 is a diagram illustrating an example of the functional configuration of the display control apparatus according to the second embodiment. The functional configuration of the display control apparatus of the second embodiment is different from that of the first embodiment illustrated in FIG. 7 in that the display control apparatus of the second embodiment additionally includes a traffic lane line detection unit 1110 and a compression region extraction unit 1120.

The traffic lane line detection unit 1110 detects image elements indicating traffic lane lines in image data transmitted from an image data obtaining unit 710. The traffic lane line detection unit 1110 transmits position coordinates indicating positions of the detected image elements indicating the traffic lane lines in the image data to the compression region extraction unit 1120 as traffic lane line position information.

The compression region extraction unit 1120 determines position coordinates for specifying a pixel region to be extracted as a compression region based on the traffic lane line position information transmitted from the traffic lane line detection unit 1110. Specifically, the compression region extraction unit 1120 determines the position coordinates of the pixel region to be extracted as a compression region such that a region specified based on the traffic lane line position information in a lower pixel region in the image data is not incorporated in the compression region. Furthermore, the compression region extraction unit 1120 extracts the pixel region specified based on the determined position coordinates. Furthermore, the compression region extraction unit 1120 transmits the extracted pixel region to a compression unit 730 as a compression region.

Figure 12A:
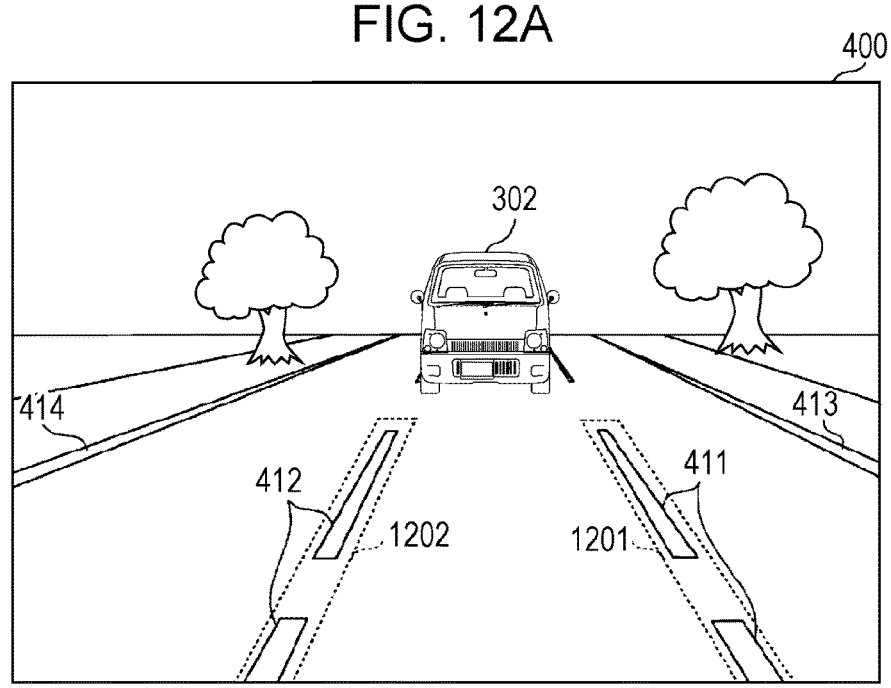
FIGS. 12A and 12B are first diagrams illustrating concrete examples of a traffic lane line detection process and a compression region extraction process.
Figure 12B:
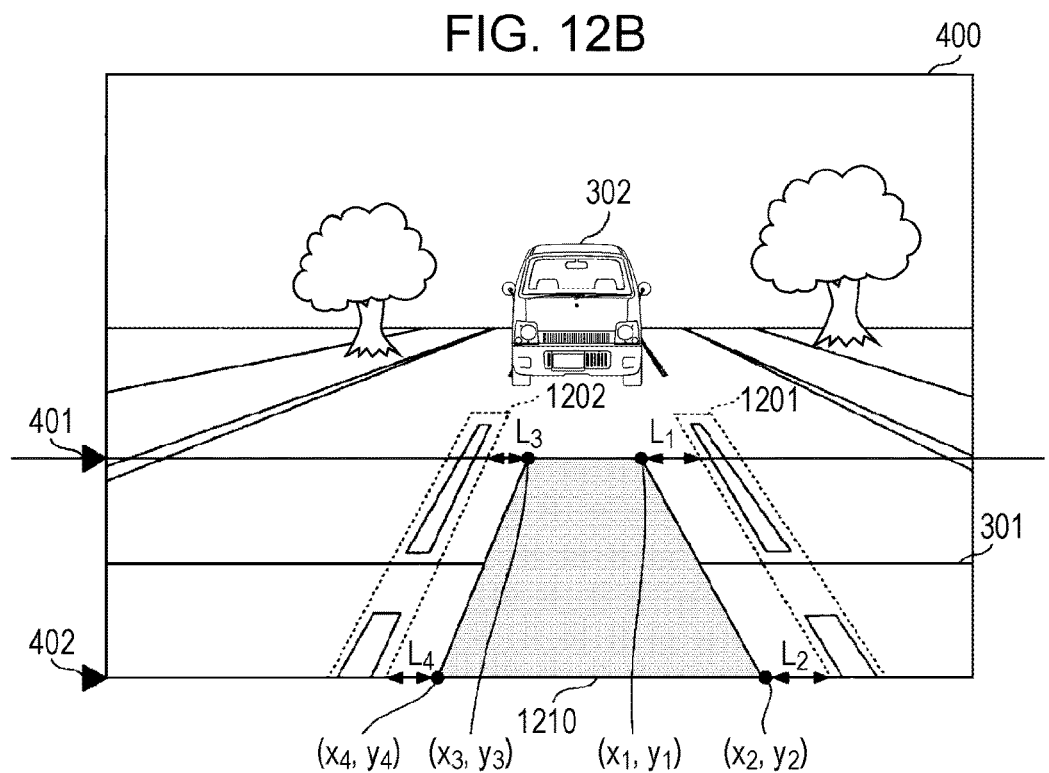

Concrete Examples of Traffic Lane Line Detection Process and Compression Region Extraction Process Next, a traffic lane line detection process performed by the traffic lane line detection unit 1110 and a compression region extraction process performed by the compression region extraction unit 1120 will be described in detail. FIGS. 12A and 12B are first diagrams illustrating concrete examples of the traffic lane line detection process and the compression region extraction process.

As illustrated in FIG. 12A, the traffic lane line detection unit 1110 detects image elements 411 and 412 indicating traffic lane lines in image data 400. Furthermore, the traffic lane line detection unit 1110 specifies a region 1201 including the image element 411 indicating the traffic lane line and a region 1202 including the image element 412 indicating the traffic lane line. Furthermore, the traffic lane line detection unit 1110 transmits traffic lane line position information indicating position coordinates of the region 1201 in the image data 400 and traffic lane line position information indicating position coordinates of the region 1202 in the image data 400 to the compression region extraction unit 1120.

In FIG. 12B, a state in which the compression region extraction unit 1120 determines the position coordinates for specifying a pixel region 1210 to be extracted as a compression region based on the traffic lane line position information transmitted from the traffic lane line detection unit 1110 is illustrated. As illustrated in FIG. 12B, the compression region extraction unit 1120 determines position coordinates of four apices for specifying the pixel region 1210 in accordance with the following process, for example.

A point positioned on a first reference position 401 and separated from the region 1201 leftward by a distance $L_1$ is determined as a position coordinate $(x_1, y_1)$ of an upper right apex of the pixel region 1210.

A point positioned on a second reference position 402 and separated from the region 1201 leftward by a distance $L_2$ is determined as a position coordinate $(x_2, y_2)$ of a lower right apex of the pixel region 1210.

A point positioned on the first reference position 401 and separated from the region 1202 rightward by a distance $L_3$ is determined as a position coordinate $(x_3, y_3)$ of an upper left apex of the pixel region 1210.

A point positioned on the second reference position 402 and separated from the region 1202 rightward by a distance $L_4$ is determined as a position coordinate $(x_4, y_4)$ of a lower left apex of the pixel region 1210.

The compression region extraction unit 1120 extracts the pixel region 1210 in the image data 400 which is specified by the determined position coordinates of the four apices (a region sandwiched between the regions 1201 and 1202 in a lower region) as a compression region.

Figure 13A:
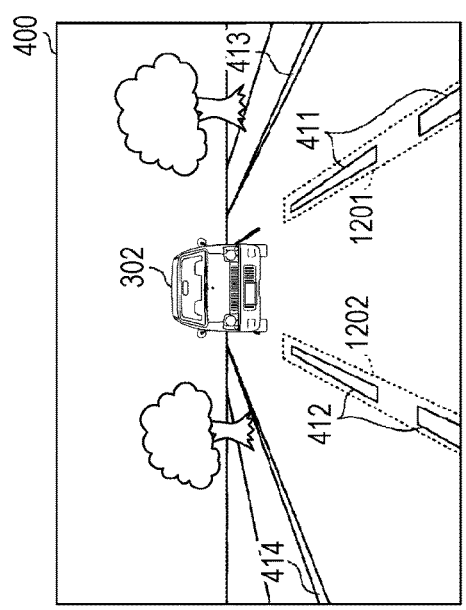
FIGS. 13A and 13B are second diagrams illustrating concrete examples of the traffic lane line detection process and the compression region extraction process.
Figure 13B:
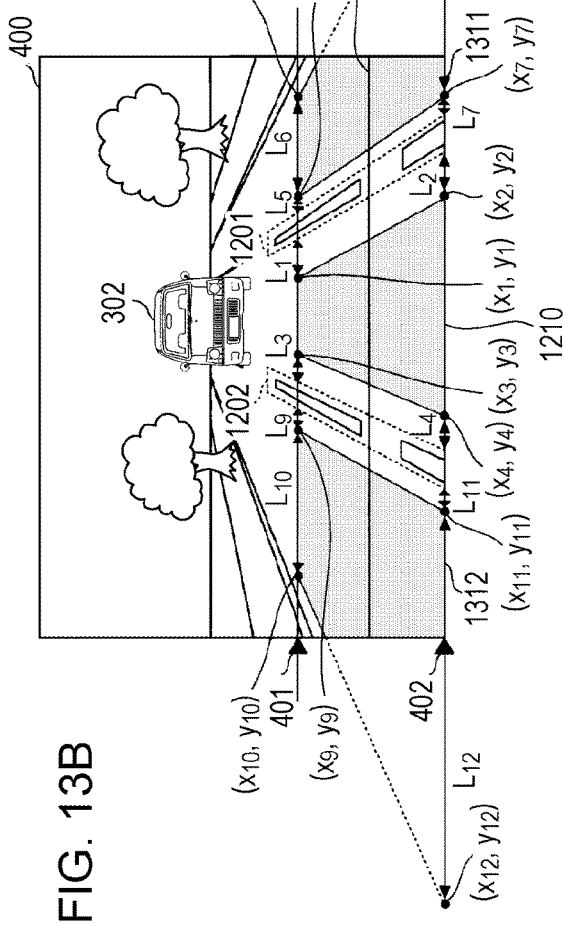

FIGS. 13A and 13B are second diagrams illustrating concrete examples of the traffic lane line detection process and the compression region extraction process. A concrete example of the traffic lane line detection process performed by the traffic lane line detection unit 1110 illustrated in FIG. 13A is the same as that in FIG. 12A, and therefore, a description thereof is omitted.

In FIG. 13B, a state in which the compression region extraction unit 1120 determines position coordinates for specifying pixel regions 1210, 1311, and 1312 to be extracted as compression regions based on traffic lane line position coordinates transmitted from the traffic lane line detection unit 1110 is illustrated. As illustrated in FIG. 13B, the compression region extraction unit 1120 determines position coordinates of four apices for each of the pixel regions 1210, 1311, and 1312 to be specified in accordance with the following process, for example.

(1) Pixel Region 1210

Determination of the position coordinates of the pixel region 1210 has been described with reference to FIG. 12B, and therefore, the description thereof is omitted here.

(2) Pixel Region 1311

A point positioned on the first reference position 401 and separated from the region 1201 rightward by a distance $L_5$ is determined as a position coordinate $(x_5, y_5)$ of an upper left apex of the pixel region 1311.

A point positioned on the first reference position 401 and separated from the upper left apex of the region 1311 rightward by a distance $L_6$ is determined as a position coordinate $(x_6, y_6)$ of an upper right apex of the pixel region 1311.

A point positioned on the second reference position 402 and separated from the region 1201 rightward by a distance $L_7$ is determined as a position coordinate $(x_7, y_7)$ of a lower left apex of the pixel region 1311.

A point positioned on the second reference position 402 and separated from the lower left apex of the region 1311 rightward by a distance $L_8$ is determined as a position coordinate $(x_8, y_8)$ of a lower right apex of the pixel region 1311.

The compression region extraction unit 1120 extracts the pixel region 1311 in the image data 400 which is specified by the determined position coordinates of the four apices as a compression region.

(3) Pixel Region 1312

- A point positioned on the first reference position 401 and separated from the region 1202 leftward by a distance $L_9$ is determined as a position coordinate $(x_9, y_9)$ of an upper right apex of the pixel region 1312.
- A point positioned on the first reference position 401 and separated from the upper right apex of the region 1312 leftward by a distance $L_{10}$ is determined as a position coordinate $(x_{10}, y_{10})$ of an upper left apex of the pixel region 1312.
- A point positioned on the second reference position 402 and separated from the region 1202 leftward by a distance $L_{11}$ is determined as a position coordinate $(x_{11}, y_{11})$ of a lower right apex of the pixel region 1312.
- A point positioned on the second reference position 402 and separated from the lower right apex of the region 1312 leftward by a distance $L_{12}$ is determined as a position coordinate $(x_{12}, y_{12})$ of a lower left apex of the pixel region 1312.

The compression region extraction unit 1120 extracts the pixel region 1312 in the image data 400 which is specified by the determined position coordinates of the four apices as a compression region.

Conclusion

As is apparent from the foregoing description, the display control apparatus 120 of this embodiment performs the following process.

- In the image data obtained by the imaging apparatus by capturing an image of a portion on a rear side of the vehicle, image elements indicating traffic lane lines are detected and position coordinates of pixel regions which do not include the detected image elements are determined.
- The pixel regions in the image data specified based on the determined positional coordinates are compressed as compression regions so as to generate compression pixel regions.
- Display image data is generated by incorporating the generated compression pixel regions in positions in the image data in which a lower region relative to a lower limit position of a display size is deleted.

Accordingly, in the display image data generated by the display control apparatus 120, the image elements indicating the traffic lane lines do not bend. Specifically, the display control apparatus 120 of this embodiment may reduce the feeling of strangeness caused by display image data visually recognized through an electronic mirror. Note that, according to this embodiment, the image elements indicating the traffic lane lines may be detected for each image data, and therefore, the possibility that the image elements indicating the traffic lane lines are incorporated in a compression region may be further reduced.

Third Embodiment

According to the first and second embodiments described above, the display apparatus 130 is disposed in a position of an in-vehicle rearview mirror and the display apparatus 130 functions as an electronic mirror in the camera monitoring system 100. However, a configuration of the camera monitoring system 100 is not limited to this. For example, a projection mirror may be disposed in the position of the in-vehicle rearview mirror and display image data may be projected on the projection mirror through a projector so that the projection mirror functions as an electronic mirror.

Figure 14A:
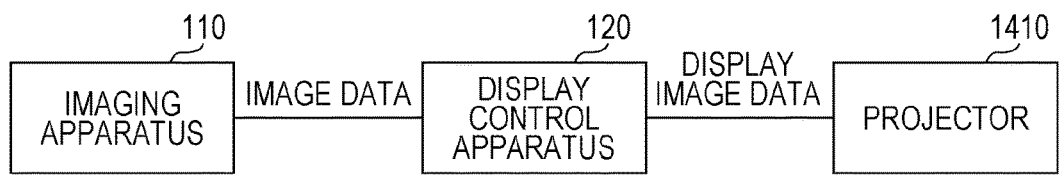
FIGS. 14A and 14B are diagrams illustrating an example of a configuration of a camera monitoring system according to a third embodiment.
Figure 14B:
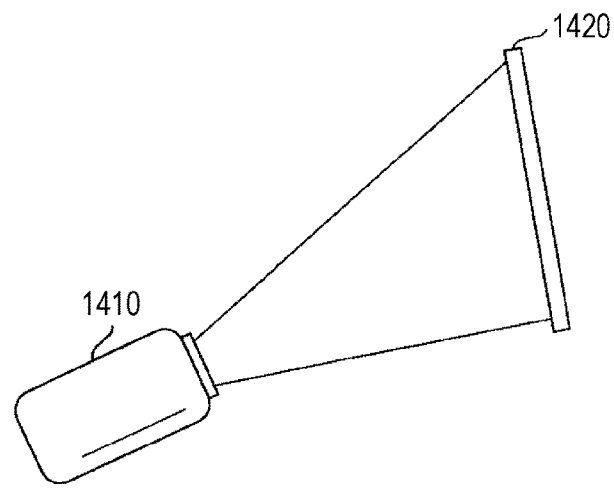

FIGS. 14A and 14B are diagrams illustrating an example of a configuration of a camera monitoring system 1400 according to a third embodiment. The camera monitoring system 1400 of FIG. 14A is different from the camera monitoring system 100 of FIG. 1 in that a projector (an image projection apparatus) 1410 is installed as an output apparatus instead of the display apparatus 130. Note that, in a case of the camera monitoring system 1400, display image data is projected on the projection mirror and is horizontally inverted in an optical manner by the projection mirror, and therefore, a captured image is not required to be horizontally inverted by an imaging apparatus 110. Therefore, the display image data transmitted from a display control apparatus 120 to the projector 1410 is generated based on image data transmitted in a state in which a captured image is not horizontally inverted.

FIG. 14B is a diagram illustrating the relationship between the projector 1410 and a projection mirror 1420. In this embodiment, the projector 1410 is disposed on a ceiling portion in the vehicle. As illustrated in FIG. 14B, display image data emitted from the projector 1410 disposed on the ceiling portion is projected on the projection mirror 1420 disposed in a position of the in-vehicle rearview mirror. By this, the driver may visually recognize the display image data through the projection mirror 1420.

Other Embodiments

Although the upper limit position of the pixel region extracted as the compression region is fixed to the first reference position 401 according to the first and second embodiments described above, the upper limit position of the pixel region extracted as the compression region may be variable. Specifically, a following-vehicle detection unit may be disposed to detect a following vehicle in image data and a lower end position of the following vehicle may be set as an upper limit position of a pixel region extracted as a compression region. Alternatively, a road surface sign detection unit may be disposed to detect a road surface sign in image data and a lower end position of the road surface sign may be set as an upper limit position of a pixel region to be extracted as a compression region. Note that, although a shape of the pixel region to be extracted as the compression region is trapezoid according to the first and second embodiments described above, the shape of the pixel region to be extracted as the compression region is not limited to trapezoid.

Furthermore, although a method for detecting the image elements 411 and 412 indicating the traffic lane lines is not described in the second embodiment, an arbitrary method for detecting the image elements 411 and 412 indicating the traffic lane lines may be employed. Furthermore, although the image elements 411 and 412 indicating the traffic lane lines are detected for each image data in the second embodiment, the image elements 411 and 412 indicating the traffic lane lines may not be detected depending on image data. In this case, the traffic lane line detection unit 1110 may estimate traffic lane lines in image data of a current frame based on image data in a frame a predetermined number of frames before the current frame. Specifically, traffic lane line position information transmitted from the traffic lane line detection unit 1110 includes position coordinates based on the image data of the current frame or position coordinates estimated based on the image data in the frame a predetermined number of frames before the current frame.

Although a method for compressing a pixel region is not described in the first to third embodiments, an arbitrary method for compressing a pixel region may be employed. For example, predetermined lines in a pixel region to be extracted as a compression region are extracted for compression or an average value of a plurality of pixels arranged adjacent to each other may be calculated in a pixel region to be extracted as a compression region for compression.

Furthermore, according to the first to third embodiments, examples of image elements indicating straight objects extending along a vehicle traveling direction include the image elements indicating the traffic lane lines and the image elements indicating the curbs between the road and the sideways. However, the image elements indicating the straight objects extending along the vehicle traveling direction are not limited to these. The examples of the image elements indicating the straight objects extending along the vehicle traveling direction further include arbitrary image elements, such as image elements indicating guardrails and an image element indicating a center median.

Furthermore, although the display image data visually recognized through the electronic mirror corresponding to an in-vehicle rearview mirror is described in the first to third embodiments, the embodiments are applicable to display image data visually recognized through an electronic mirror corresponding to a rearview mirror other than the in-vehicle rearview mirror.

Furthermore, although the image data obtained by horizontally inverting an image captured by the imaging apparatus 110 is transmitted to the display control apparatus 120 according to the first and second embodiments, the process of horizontally inverting a captured image may be executed by the display control apparatus 120.

Furthermore, the display apparatus 130 is disposed in a position of the in-vehicle rearview mirror according to the first embodiment. However, the configuration of the camera monitoring system 100 is not limited to this and a display apparatus including a movable half mirror on a front surface thereof may be disposed in a position of the in-vehicle rearview mirror, for example. In this case, the display apparatus 130 starts display of display image data when a mode for displaying display image data is turned on, whereas the display apparatus 130 terminates the display of the display image data when the mode is turned off. During the mode is in the On state, the driver visually recognizes the display image data displayed through the display apparatus 130 so as to check a rear side of the vehicle.

On the other hand, when the mode for displaying the display image data is in the Off state, a mode for operating the half mirror as an in-vehicle rearview mirror is turned on and the half mirror is moved to a predetermined position. In this case, the driver checks the rear side of the vehicle through the half mirror.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display control apparatus connected to an imaging apparatus installed in a vehicle, the display control apparatus comprising:
   an obtaining unit configured to obtain image data obtained by the imaging apparatus capturing an image of a portion on a rear side of the vehicle;
   a specifying unit configured to specify, as a compression region, a pixel region which does not include image elements indicating straight objects extending along a traveling direction of the vehicle in a pixel region in a lower portion in the image data;
   a generation unit configured to generate display image data of a predetermined display size by compressing, in the traveling direction of the vehicle, the specified compression region in the image data, and not compressing image elements indicating straight objects extending along the traveling direction; and
   a controller configured to perform control so that the generated display image data is visually displayed through an electronic mirror disposed as a rearview mirror of the vehicle.

2. The display control apparatus according to claim 1, wherein the generation unit deletes a region determined in advance based on a difference between a size of the image data and a size of the display image data from the image data, and a compression pixel region obtained by compressing the compression region is incorporated in a portion of the image data which has been subjected to the deletion so that the display image data is generated.

3. The display control apparatus according to claim 1, wherein the specifying unit specifies the compression region using position coordinates determined in advance based on an installation position of the imaging apparatus.

4. The display control apparatus according to claim 3, wherein the specifying unit specifies a pixel region corresponding to a portion in the vicinity of a center position in a width direction of the vehicle as a compression region.

5. The display control apparatus according to claim 1, wherein the specifying unit detects image elements in the image data and determines position coordinates of the pixel region which does not include the detected image elements so as to specify the compression region.

6. The display control apparatus according to claim 5,
   wherein the straight objects extending along the traveling direction of the vehicle indicate traffic lane lines, and
   the specifying unit specifies a pixel region sandwiched between image elements indicating a plurality of traffic lane lines as a compression region.

7. The display control apparatus according to claim 1, wherein an upper limit position of a pixel region in a lower portion in the image data corresponds to a lower end position of an image element indicating a following vehicle or a lower end position of an image element indicating a road surface sign.

8. A display control method of a display control apparatus connected to an imaging apparatus installed in a vehicle, the display control method comprising:
   obtaining image data obtained by the imaging apparatus capturing an image of a portion on a rear side of the vehicle;
   specifying, as a compression region, a pixel region which does not include image elements indicating straight objects extending along a traveling direction of the vehicle in a pixel region in a lower portion in the image data;
   generating display image data of a predetermined display size by compressing, in the traveling direction of the vehicle, the specified compression region in the image data, and not compressing image elements indicating straight objects extending along the traveling direction; and performing control so that the generated display image data is visually displayed through an electronic mirror disposed as a rearview mirror of the vehicle.

9. The display control method according to claim 8, wherein the act of generating display image data deletes a region determined in advance based on a difference between a size of the image data and a size of the display image data from the image data, and a compression pixel region obtained by compressing the compression region is incorporated in a portion of the image data which has been subjected to the deletion so that the display image data is generated.

10. The display control method according to claim 8, wherein the act of specifying a compression region specifies the compression region using position coordinates determined in advance based on an installation position of the imaging apparatus.

11. The display control method according to claim 10, wherein the act of specifying a compression region specifies a pixel region corresponding to a portion in the vicinity of a center position in a width direction of the vehicle as a compression region.

12. The display control method according to claim 8, wherein the act of specifying a compression region detects image elements in the image data and determines position coordinates of the pixel region which does not include the detected image elements so as to specify the compression region.

13. The display control method according to claim 12,
wherein the straight objects extending along the traveling direction of the vehicle indicate traffic lane lines, and
the act of specifying a compression region specifies a pixel region sandwiched between image elements indicating a plurality of traffic lane lines as a compression region.

14. The display control method according to claim 8, wherein an upper limit position of a pixel region in a lower portion in the image data corresponds to a lower end position of an image element indicating a following vehicle or a lower end position of an image element indicating a road surface sign.

15. A camera monitoring system comprising:
an imaging apparatus configured to capture a rear side of a vehicle;
a display control apparatus configured to process image data obtained by the imaging apparatus; and
an output apparatus connected to the display control apparatus,
wherein the display control apparatus includes
an obtaining unit configured to obtain image data obtained by the imaging apparatus,
a specifying unit configured to specify, as a compression region, a pixel region which does not include image elements indicating straight objects extending along a traveling direction of the vehicle in a pixel region in a lower portion in the image data,
a generation unit configured to generate display image data of a predetermined display size by compressing, in the traveling direction of the vehicle, the specified compression region in the image data, and not compressing image elements indicating straight objects extending along the traveling direction, and
a controller configured to perform control so that the generated display image data is visually displayed through an electronic mirror disposed as a rearview mirror of the vehicle.

16. The camera monitoring system according to claim 15, wherein the generation unit deletes a region determined in advance based on a difference between a size of the image data and a size of the display image data from the image data, and a compression pixel region obtained by compressing the compression region is incorporated in a portion of the image data which has been subjected to the deletion so that the display image data is generated.

17. The camera monitoring system according to claim 15, wherein the specifying unit specifies the compression region using position coordinates determined in advance based on an installation position of the imaging apparatus.

18. The camera monitoring system according to claim 17, wherein the specifying unit specifies a pixel region corresponding to a portion in the vicinity of a center position in a width direction of the vehicle as a compression region.

19. The camera monitoring system according to claim 15, wherein the specifying unit detects image elements in the image data and determines position coordinates of the pixel region which does not include the detected image elements so as to specify the compression region.

20. The camera monitoring system according to claim 19,
wherein the straight objects extending along the traveling direction of the vehicle indicate traffic lane lines, and
the specifying unit specifies a pixel region sandwiched between image elements indicating a plurality of traffic lane lines as a compression region.

21. The camera monitoring system according to claim 15, wherein an upper limit position of a pixel region in a lower portion in the image data corresponds to a lower end position of an image element indicating a following vehicle or a lower end position of an image element indicating a road surface sign.

* * * * *